(12) United States Patent
Hsu et al.

(10) Patent No.: US 12,455,464 B2
(45) Date of Patent: Oct. 28, 2025

(54) FLOATING IMAGE GENERATION DEVICE AND ELECTRONIC DEVICE

(71) Applicant: Darwin Precisions Corporation, Hsinchu County (TW)

(72) Inventors: Chih-Ping Hsu, Hsinchu County (TW); Ya Han Ko, Hsinchu County (TW); Ran-Shiou You, Hsinchu County (TW); Yu Jen Lai, Hsinchu County (TW)

(73) Assignee: DARWIN PRECISIONS CORPORATION, Hsinchu County (TW)

(*) Notice: Subject to any disclaimer, the term of this patent is extended or adjusted under 35 U.S.C. 154(b) by 468 days.

(21) Appl. No.: 17/974,746

(22) Filed: Oct. 27, 2022

(65) Prior Publication Data
US 2023/0148239 A1     May 11, 2023

(30) Foreign Application Priority Data

Nov. 8, 2021   (TW) .................................. 110141570

(51) Int. Cl.
*G02B 30/56* (2020.01)
(52) U.S. Cl.
CPC .................................. *G02B 30/56* (2020.01)
(58) Field of Classification Search
CPC ........ G02B 30/56; G02B 30/30; G02B 30/34; G02B 30/40; G02B 30/50
USPC ........................................................ 359/462
See application file for complete search history.

(56) References Cited

U.S. PATENT DOCUMENTS

| 5,712,731 | A | * | 1/1998 | Drinkwater | G02B 5/1885 359/623 |
| 8,687,273 | B2 | * | 4/2014 | Fukushima | G02B 30/27 359/464 |
| 9,007,691 | B2 | * | 4/2015 | Yumoto | G02B 3/005 359/620 |
| 2002/0054434 | A1 | * | 5/2002 | Florczak | G02B 27/1066 359/627 |

(Continued)

FOREIGN PATENT DOCUMENTS

| CN | 101258534 A | 9/2008 |
| CN | 204955892 U | 1/2016 |

(Continued)

*Primary Examiner* — Zachary W Wilkes
*Assistant Examiner* — Elizabeth M Hall
(74) *Attorney, Agent, or Firm* — WPAT, PC

(57) ABSTRACT

A floating image generation device is disclosed, which includes a light source, a first image forming unit, a second image forming unit, a floating image generation unit, and a transflective layer. The first image forming unit is disposed on the light source. The second image forming unit is disposed on the first image forming unit. The floating image generation unit is disposed on the second image forming unit. The transflective layer is disposed between the first image forming unit and the second image forming unit. The light source is capable of transmitting a first light to pass through the first image forming unit, the second image forming unit, the floating image generation unit, and the transflective layer for generating a floating image. At least a portion of a second light from the other side of the floating image generation unit is reflected by the transflective layer for generating a flat image.

12 Claims, 5 Drawing Sheets

(56) References Cited

U.S. PATENT DOCUMENTS

| | | | | |
|---|---|---|---|---|
| 2004/0021802 A1* | 2/2004 | Yoshino | ............... | C08F 110/02 349/1 |
| 2006/0262376 A1* | 11/2006 | Mather | ............... | H04N 13/32 359/248 |
| 2008/0204874 A1* | 8/2008 | Kim | ............... | G02B 30/27 359/465 |
| 2010/0283838 A1* | 11/2010 | Tomisawa | ............... | G06F 3/0412 348/51 |
| 2011/0234605 A1* | 9/2011 | Smith | ............... | G09G 3/003 359/462 |
| 2015/0323803 A1* | 11/2015 | Tung | ............... | G02B 30/25 359/465 |
| 2018/0024373 A1* | 1/2018 | Joseph | ............... | G02B 30/56 359/629 |

FOREIGN PATENT DOCUMENTS

| | | |
|---|---|---|
| TW | 200809328 A | 2/2008 |
| TW | M474930 U | 3/2014 |
| TW | 201918765 | 5/2019 |
| TW | I764794 | 5/2022 |

\* cited by examiner

FLOATING IMAGE GENERATION DEVICE AND ELECTRONIC DEVICE

CROSS-REFERENCE TO RELATED APPLICATION

This application claims the priority benefit of Taiwan application serial no. 110141570 filed on Nov. 8, 2021. The entirety of the above-mentioned patent applications is hereby incorporated by reference herein and made a part of this specification.

BACKGROUND

Technical Field

The present invention relates to a floating image generation device and an electronic device.

Related Art

With the progress of the technology, display techniques continuously evolve to satisfy users' requirement of greater visual experience. In the field of three-dimensional display techniques, 3D glasses and naked-eye 3D display techniques are commonly used. With naked-eye 3D display technique, users can see 3D images directly without wearing any device. With 3D display technique using glasses, users have to see 3D image by wearing glasses having polarized lens, shutter lens, etc. Naked-eye 3D display technique is popular among customers due to its convenience and comfort, wherein floating image generation technique attracts customer's attention especially. One feature of floating image generation technique is the capability to project floating images in space, wherein floating images not only can be seen but also can have interaction with customers at close range. However, for conventional floating image generation devices, back lights are needed to see floating images. In other words, floating images vanish when back lights are extinguished. As such, conventional floating image generation devices are still improvable.

SUMMARY

One of objectives of the present invention is to provide a floating image generation device, capable of displaying images when back lights are extinguished.

One of objectives of the present invention is to provide an electronic device, capable of providing better user's experience.

The floating image generation device of the present invention includes a light source, a first image forming unit, a second image forming unit, a floating image generation unit, and transflective layer. The first image forming unit is disposed above the light source. The second image forming unit is disposed above the first image forming unit. The floating image generation unit is disposed above the second image forming unit. The transflective layer is disposed between the first image forming unit and the second image forming unit. The light source is capable of transmitting a first light to pass through the first image forming unit, the transflective layer, the second image forming unit, and the floating image generation unit for generating a floating image. At least a portion of a second light from the other side of the floating image generation unit with respect to the light source is reflected by the transflective layer to pass through the second image forming unit for generating a flat image.

In one embodiment, the first image forming unit is disposed above the light source. The floating image generation unit is disposed above the first image forming unit. The second image forming unit is disposed above the floating image generation unit. The transflective layer is disposed between the first image forming unit and the second image forming unit.

The electronic device of the present invention includes the floating image generation device and a casing. The casing includes a translucent portion. The first light is capable of passing through the first image forming unit, the second image forming unit, the floating image generation unit, the transflective layer, and the translucent portion for generating a floating image outside the casing. The second light is capable of transmitting through the translucent portion from outside the casing and is at least partially reflected by the transflective layer to pass through the second image forming unit for generating the flat image.

DETAILED DESCRIPTION

Figure 1A:
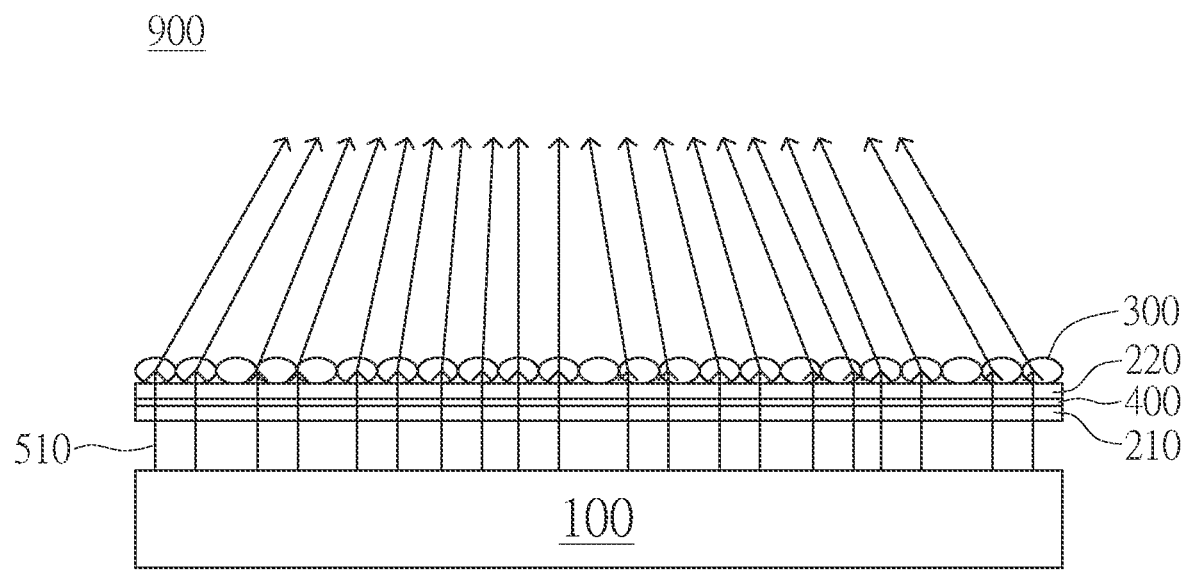
FIG. 1A is a schematic diagram of an embodiment of a floating image generation device according to the present invention.

Implementations of a connection assembly disclosed by the present invention are described below by using particular and specific embodiments with reference to the drawings, and a person skilled in the art may learn of advantages and effects of the present invention from the disclosure of this specification. However, the following disclosure is not intended to limit the protection scope of the present invention, and a person skilled in the art may carry out the present invention by using other different embodiments based on different viewpoints without departing from the concept and spirit of the present invention. In the accompanying drawings, plate thicknesses of layers, films, panels, regions, and the like are enlarged for clarity. Throughout the specification, same reference numerals indicate same elements. It should be understood that when an element such as a layer, film, region or substrate is referred to as being "on" or "connected" to another element, it may be directly on or connected to the another element, or intervening elements may also be present. In contrast, when an element is referred to as being "directly on" or "directly connected to" another element, there is no intervening element present. As used herein, "connection" may refer to a physical and/or electrical connection. Further, "electrical connecting" or "coupling" may indicate that another element exists between two elements.

It should be noted that the terms "first", "second", "third", and the like that are used in the present disclosure can be used for describing various elements, components, regions, layers and/or portions, but the elements, components, regions, layers and/or portions are not limited by the terms. The terms are merely used to distinguish one element, component, region, layer, or portion from another element, component, region, layer, or portion. Therefore, the "first element", "component", "region", "layer", or "portion" discussed below may be referred to as a second element, component, region, layer, or portion without departing from the teaching of this disclosure.

In addition, relative terms, such as "down" or "bottom" and "up" or "top", are used to describe a relationship between an element and another element, as shown in the figures. It should be understood that the relative terms are intended to include different orientations of a device in addition to orientations shown in the figures. For example, if a device in a figure is turned over, an element that is described to be on a "lower" side of another element is directed to be on an "upper" side another element. Therefore, the exemplary terms "down" may include orientations of "down" and "up" and depends on a particular orientation of an accompanying drawing. Similarly, if a device in a figure is turned over, an element that is described as an element "below" another element or an element "below" is directed to be "above" another element. Therefore, the exemplary terms "below" or "below" may include orientations of up and down.

As used herein, "about", "approximately", or "substantially" is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, ±20%, ±10%, ±5% of the stated value. Further, as used herein, "about", "approximately", or "substantially" may depend on optical properties, etch properties, or other properties to select a more acceptable range of deviations or standard deviations without one standard deviation for all properties.

As shown in the embodiment in FIG. 1A, the floating image generation device 900 of the present invention includes a light source 100, a first image forming unit 210, a second image forming unit 220, a floating image generation unit 300, and a transflective layer 400. The light source 100 can be a point light source such as an LED or a diffused/homogenized planar light source. The first image forming unit 210 is disposed above the light source 110 and has a pattern to be generated as a desired floating image. The second image forming unit 220 is disposed above the first image forming unit 210 and has a pattern to be formed as a desired flat image. More particularly, the patterns on the first image forming unit 210 and the second image forming unit 220 can block lights. In different embodiments, the first image forming unit 210 and the second image forming unit 220 can be negative films or masks having fixed patterns, or liquid crystal layers having changeable patterns.

The floating image generation unit 300 is disposed above the second image forming unit. In an embodiment, the floating image generation unit 300 can be a micro-lens array, which can include single-side or dual-side converging lens structures and can be formed by processes such as UV-imprinting, injection, heat-pressing, etc. The transflective layer 400 is disposed between the first image forming unit 210 and the second image forming unit 220, and permits lights to partially pass through and be partially reflected. In an embodiment, the transflective layer 400 is a metallic layer of materials such as silver, aluminum, copper, etc., and can be formed by processes such as evaporation, electroless plating, etc. The transflective extent can be modified by controlling conditions such as thickness, density, etc.

As shown in the embodiment in FIG. 1A, the light source 100 is capable of transmitting a first light 510 to pass through the first image forming unit 210, the transflective layer 400, the second image forming unit 220, and the floating image generation unit 300 for generating a floating image. More particularly, after passing through the first image forming unit 210, the first light 510 emitted by the light source 100 can at least partially pass through the transflective layer 400 in accordance with the transflective characteristic and, after passing through the second image forming unit 220, generate a floating image on the side of the floating image generation unit 300 opposite to the light source 100 by the refracting of the floating image generation unit 300. Specifically, after passes through the first image forming unit 210, the first light 510 emitted by the light source 100 forms a pattern of the floating image and generates the floating image via refraction by the floating image generation unit 300. In an embodiment, as shown in the embodiment in FIG. 1B, the floating image 610 is generated outside the top face of the floating image generation device 900.

Figure 2A:
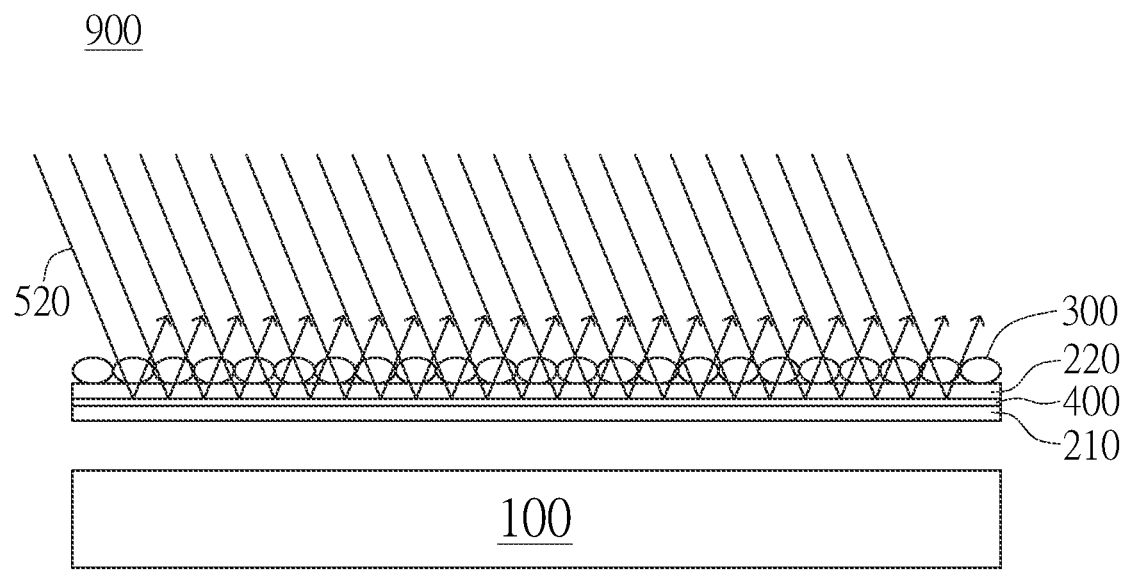
FIG. 2A is a schematic diagram of an embodiment of a second light reflected by a transflective layer in a floating image generation device according to the present invention.
Figure 2B:
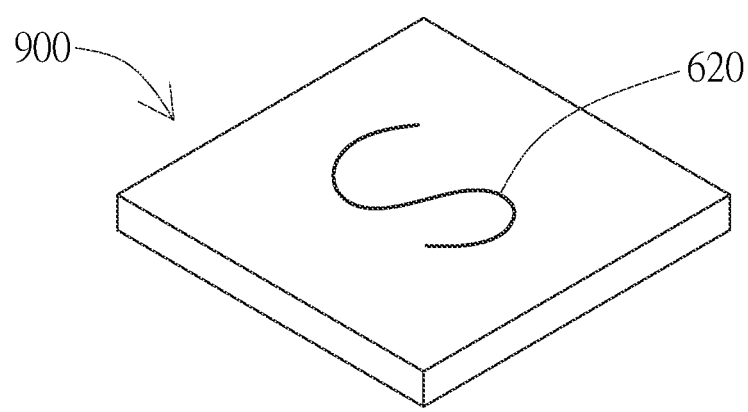
FIG. 2B is a schematic diagram of an embodiment of a floating image generation device generating a flat image according to the present invention.

As shown in the embodiment in FIG. 2A, a second light 520 coming from the side of the floating image generation unit 300 opposite to the light source 100 can be at least partially reflected by the transflective layer 400 and pass through the second image forming unit 220 to generate a flat image. The second light 520 can be a light such as an ambient light or an outer projecting light. More particularly, after passing through the second image forming unit 220, the first light 520 coming from the side of the floating image generation unit 300 opposite to the light source 100 can be at least partially reflected by the transflective layer 400 in accordance with the transflective characteristic and pass through the second image forming unit 220 again to generate the flat image. In an embodiment, as shown in the embodiment in FIG. 2B, the flat image 620 is displayed on the top face of the floating image generation device 900 visually.

Accordingly, the floating image generation device 900 of the present invention can generate a floating image when the light source emits a first light 510, and generate a flat image by a second light 520 coming from the ambient, for example. More particularly, the first light 510 emitted by the light source 100 forms the pattern of a floating image via the first image forming unit 210 and then generates the floating image via refraction by the floating image generation unit 300, wherein the first light 520 is reflected by the transflective layer 400 and generates the flat image by the second image forming unit 220. In other words, even though the light source doesn't emit light, the floating image generation device 900 of the present invention can still generate a flat image via a second light 520 coming from the ambient, hence avoiding displaying without any image.

Figure 1B:
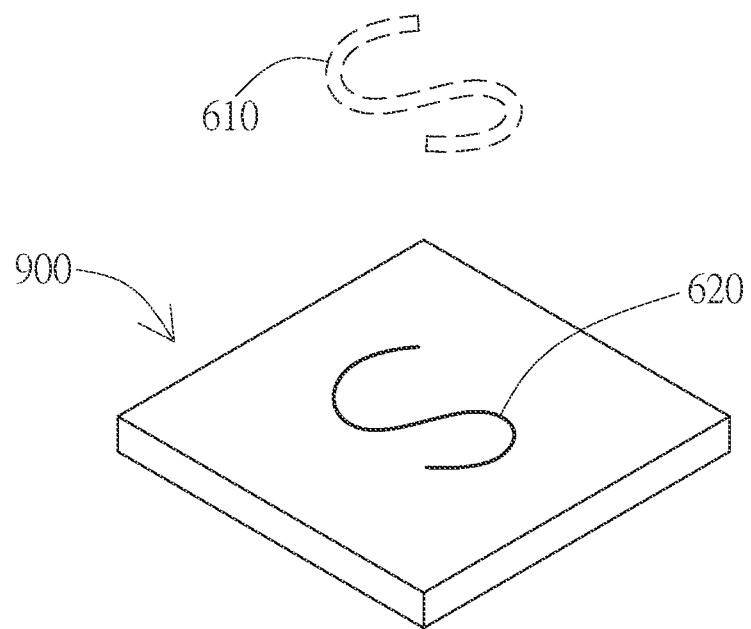
FIG. 1B is a schematic diagram of an embodiment of a floating image generation device generating a floating image according to the present invention.
Figure 3:
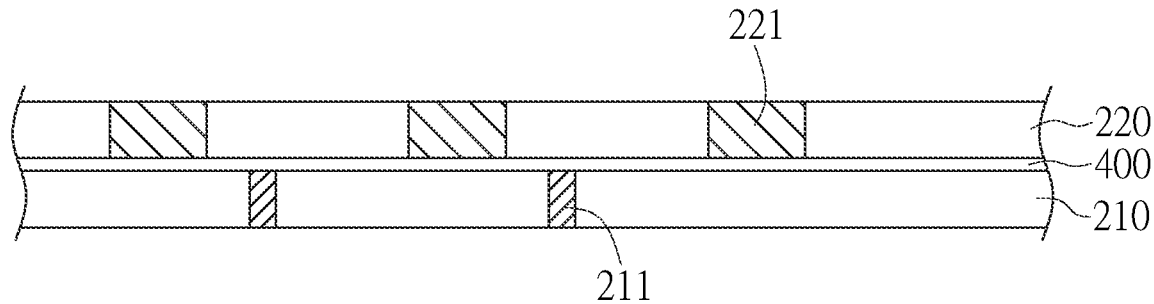
FIG. 3 is a schematic diagram of an embodiment of first shading portions and second shading portions in a floating image generation device according to the present invention.

As shown in the embodiment in FIG. 1B, the floating image 610 and the flat image 620 can exist at the same time since they are generated by different lights. More particularly, as shown in the embodiment in FIG. 3, the first image forming unit 210 includes a plurality of first shading portions 211, wherein a first image region is defined by the first shading portions 211 for generating the floating image 610. The second image forming unit 220 includes a plurality of second shading portions 221, wherein a second image region is defined by the second shading portions 221 for generating the flat image 620. In an embodiment, the vertical projection of the first shading portions 211 and the vertical projection of the second shading portions 221 are at least partially not overlapped on the face of the light source 100 (see FIG. 2A) facing the first image forming unit 210, in order to avoid the blocking of the first light 510 passing through the first image forming unit 210 by the second shading portions 221 in the second image forming unit 220. In an embodiment, the first image region and the second image region are substantially the same. Hence, the generated floating image 610 and flat image 620 are substantially the same (for example, they are both the shape "S" as shown in FIG. 1B) for visual coherence. In different embodiments, however, the first image region and the second image region are substantially different. Hence, the generated floating image 610 and flat image 620 are substantially different for more visual variety.

Figure 4:
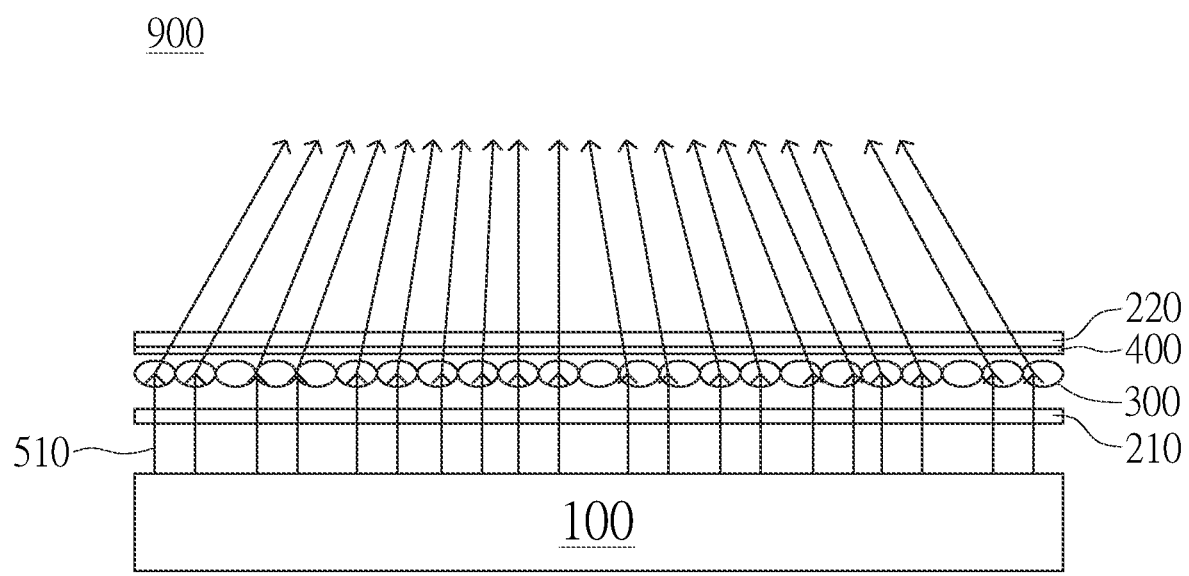
FIGS. 4 to 7 are schematic diagrams of embodiments of the floating image generation device according to the present invention.

In different embodiments, the relative position of the first image forming unit 210, the second image forming unit 220, the floating image generation unit 300, and the transflective layer 400 could be modified according to the manufacturing, design, and usage requirements. More particularly, as shown in the embodiments in FIG. 4, the first image forming unit 210 is disposed above the light source 100. The floating image generation unit 300 is disposed above the first image forming unit 210. The second image forming unit 220 is disposed above the floating image generation unit 300. The transflective layer 400 is disposed on the face of the second image forming unit 220 facing the floating image generation unit 300.

Figure 5:
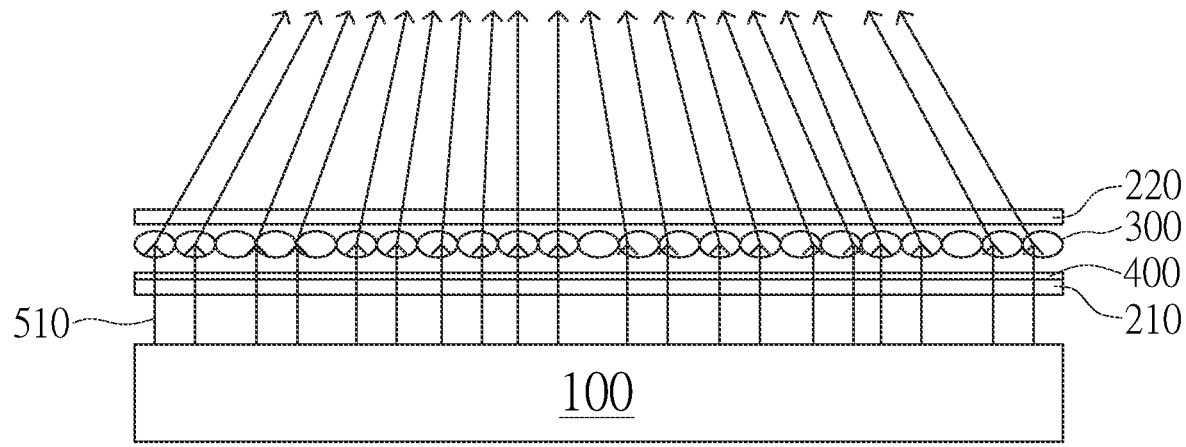
Figure 6:
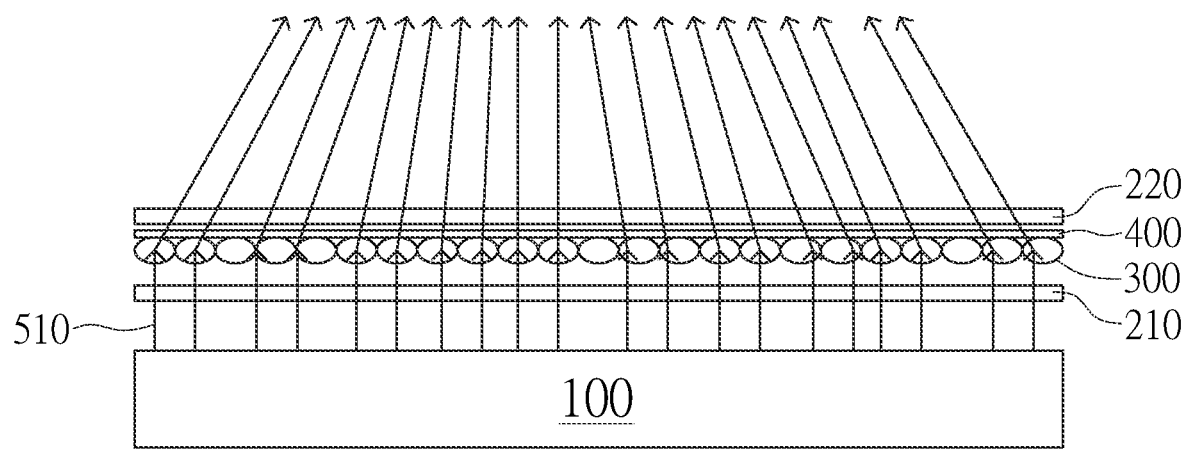
Figure 7:
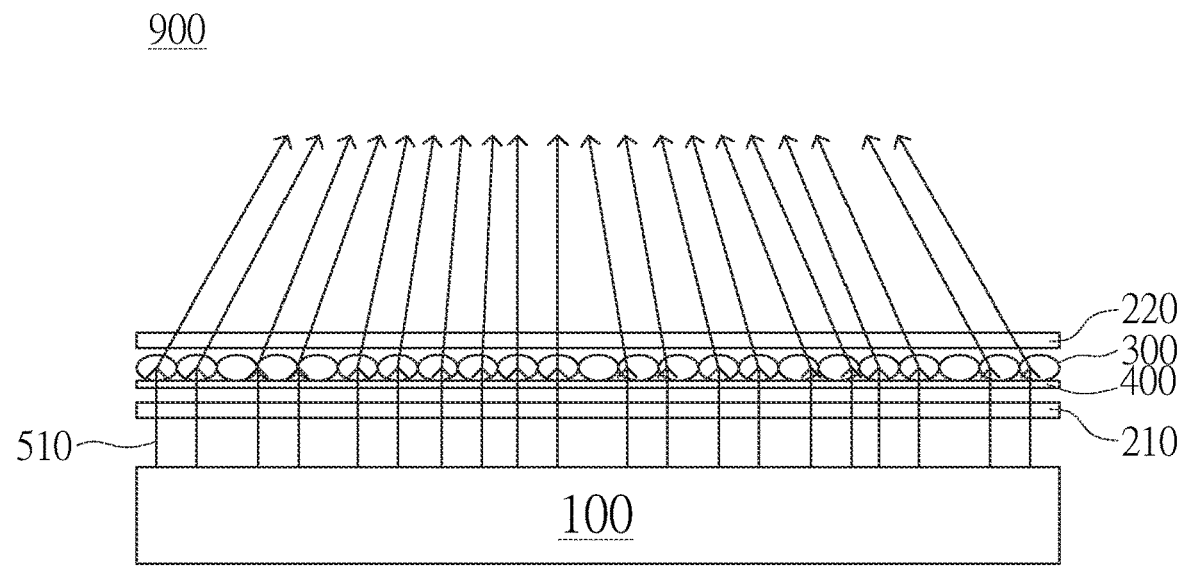

Specifically, the transflective layer 400 can perform its transflective characteristic as long as the transflective layer 400 is disposed between the first image forming unit 210 and the second image forming unit 220, hence letting the light emitted by the light source 100 pass through it to generate the floating image and reflect the light coming from outside to generate the flat image. Accordingly, the position of the transflective layer 400 could be modified. As shown in the embodiments in FIG. 5, the transflective layer 400 is disposed on the face of the first image forming unit 210 facing the floating image generation unit 300. As shown in the embodiments in FIG. 6, the transflective layer 400 is disposed on the face of the floating image generation unit 300 facing the second image forming unit 220. As shown in the embodiments in FIG. 7, the transflective layer 400 is disposed on the face of the floating image generation unit 300 facing the first image forming unit 210.

Figure 8:
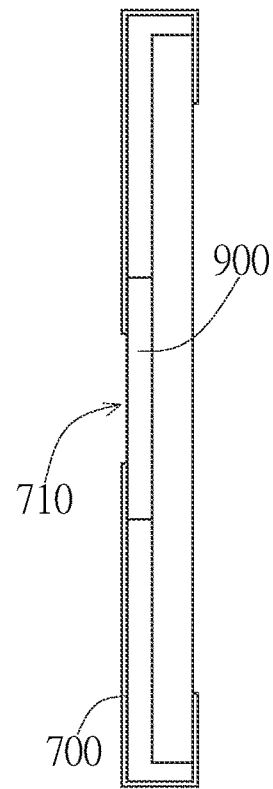
FIG. 8 is a schematic diagram of an embodiment of an electronic device according to the present invention.

As shown in the embodiments in FIG. 8, the floating image generation device 900 could form an electronic device 800 of the present invention with a casing 700. The casing 700 includes a translucent portion 710, wherein the translucent portion 710 can be hallow or disposed with a translucent unit to block moisture or dusts. The first light 510 (see FIG. 1A) is capable of passing through the first image forming unit 210, the second image forming unit 220, the floating image generation unit 300, the transflective layer 400, and the translucent portion 710 to generate a floating image outside the casing 700. The second light 520 (see FIG. 2A) is capable of transmitting through the translucent portion 710 from outside the casing 700 and is at least partially reflected by the transflective layer 400 to pass through the second image forming unit 220 for generating the flat image. For example, in an embodiment, the electronic device 800 is a laptop, wherein the casing 700 is the case of the laptop and the backlight module of the laptop could be used as the light source of the floating image generation device 900. When the laptop is in use, the light emitted by the backlight module makes the floating image generation device 900 generate the floating image. When the laptop is in stand-by/off state, the backlight module doesn't emit light, wherein the floating image generation device 900 generates the flat image by ambient light. Accordingly, the electronic device is capable of providing better user experience.

The present invention is described by means of the above-described relevant embodiments. However, the above-described embodiments are only examples for implementing the present invention. It should be pointed out that the disclosed embodiments do not limit the scope of the present invention. In contrast, the spirit included in the scope of the patent application and modifications and equivalent settings made within the scope are all included in the scope of the present invention.

What is claimed is:

1. A floating image generation device, comprising:
   a light source;
   a first image forming unit disposed above the light source;
   a second image forming unit disposed above the first image forming unit;
   a floating image generation unit disposed above the second image forming unit; and
   a transflective layer disposed between the first image forming unit and the second image forming unit;
   wherein the light source is capable of transmitting a first light to pass through the first image forming unit, the transflective layer, the second image forming unit, and the floating image generation unit for generating a floating image, wherein at least a portion of a second light from the other side of the floating image generation unit with respect to the light source is reflected by the transflective layer to pass through the second image forming unit for generating a flat image.

2. The floating image generation device according to claim 1, wherein the first image forming unit includes a plurality of first shading portions, wherein the second image forming unit includes a plurality of second shading portions, the vertical projection of the first shading portions and the vertical projection of the second shading portions are at least partially not overlapped on one face of the light source corresponding to the first image forming unit.

3. The floating image generation device according to claim 2, wherein a first image region is defined by the first shading portions for generating the floating image, wherein a second image region is defined by the second shading portions for generating the flat image, wherein the first image region and the second image region have the same outlines.

4. An electronic device, comprising:
   the floating image generation device according to claim 1;
   a casing including a translucent portion, wherein:
      the first light is capable of passing through the first image forming unit, the second image forming unit, the floating image generation unit, the transflective layer, and the translucent portion for generating a floating image outside the casing; and
      the second light is capable of transmitting through the translucent portion from outside the casing and is at least partially reflected by the transflective layer to pass through the second image forming unit for generating the flat image.

5. A floating image generation device, comprising:
a light source;
a first image forming unit disposed above the light source;
a floating image generation unit disposed above the first image forming unit;
a second image forming unit disposed above the floating image generation unit; and
a transflective layer disposed between the first image forming unit and the second image forming unit;
wherein the light source is capable of transmitting a first light to pass through the first image forming unit, the floating image generation unit, the transflective layer, and the second image forming unit for generating a floating image, wherein at least a portion of a second light from the other side of the floating image generation unit with respect to the light source is reflected by the transflective layer to pass through the second image forming unit for generating a flat image.

6. The floating image generation device according to claim 5, wherein the transflective layer is disposed on one face of the second image forming unit facing the floating image generation unit.

7. The floating image generation device according to claim 5, wherein the transflective layer is disposed on one face of the first image forming unit facing the floating image generation unit.

8. The floating image generation device according to claim 5, wherein the transflective layer is disposed on one face of the floating image generation unit facing the second image forming unit.

9. The floating image generation device according to claim 5, wherein the transflective layer is disposed on one face of the floating image generation unit facing the first image forming unit.

10. The floating image generation device according to claim 5, wherein the first image forming unit includes a plurality of first shading portions, wherein the second image forming unit includes a plurality of second shading portions, the vertical projection of the first shading portions and the vertical projection of the second shading portions are at least partially not overlapped on one face of the light source corresponding to the first image forming unit.

11. The floating image generation device according to claim 10, wherein a first image region is defined by the first shading portions for generating the floating image, wherein a second image region is defined by the second shading portions for generating the flat image, wherein the first image region and the second image region have the same outlines.

12. An electronic device, comprising:
the floating image generation device according to claim 5;
a casing including a translucent portion, wherein:
the first light is capable of passing through the first image forming unit, the second image forming unit, the floating image generation unit, the transflective layer, and the translucent portion for generating a floating image outside the casing; and
the second light is capable of transmitting through the translucent portion from outside the casing and is at least partially reflected by the transflective layer to pass through the second image forming unit for generating the flat image.

* * * * *